Aug. 25, 1964     J. C. O'DAY     3,145,926
HIGH PRESSURE COLD AIR—HOT AIR MIXING
BOX FOR A VENTILATING, HEATING AND
AIR CONDITIONING SYSTEM
Filed Nov. 4, 1960     4 Sheets-Sheet 1
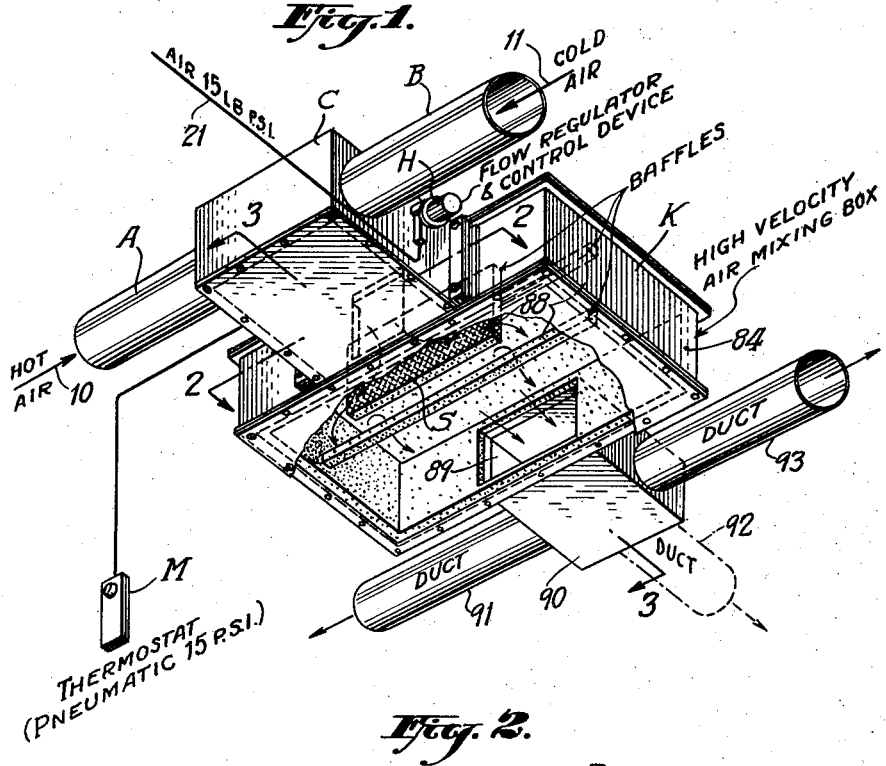
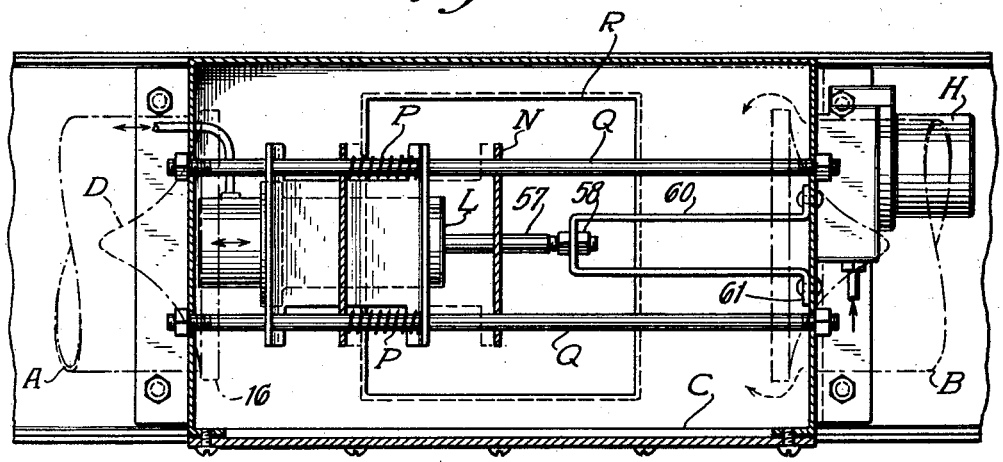
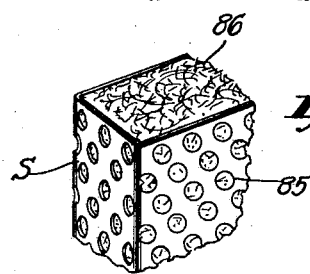
INVENTOR.
JAMES C. O'DAY
BY
ATTORNEY.

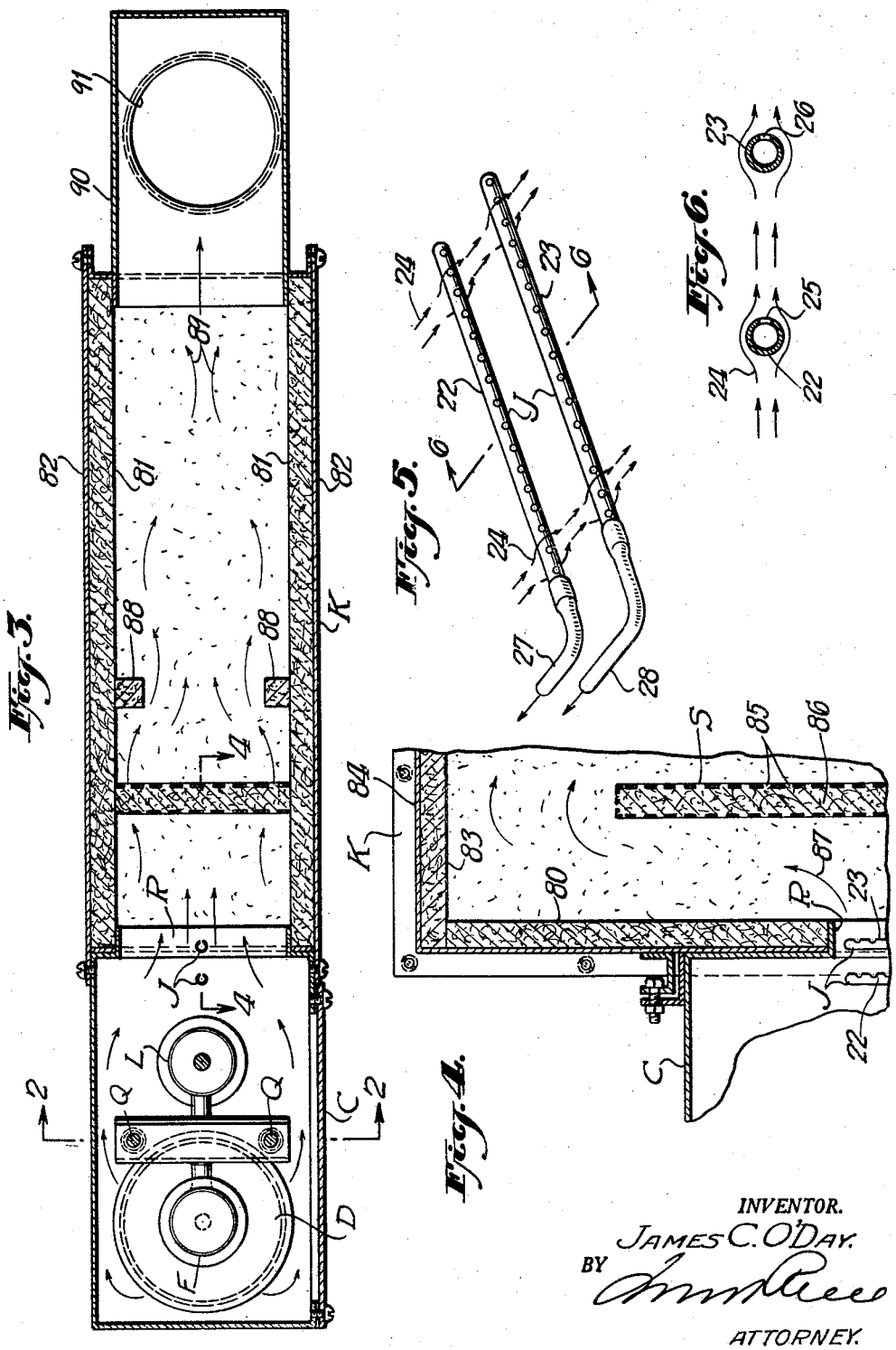

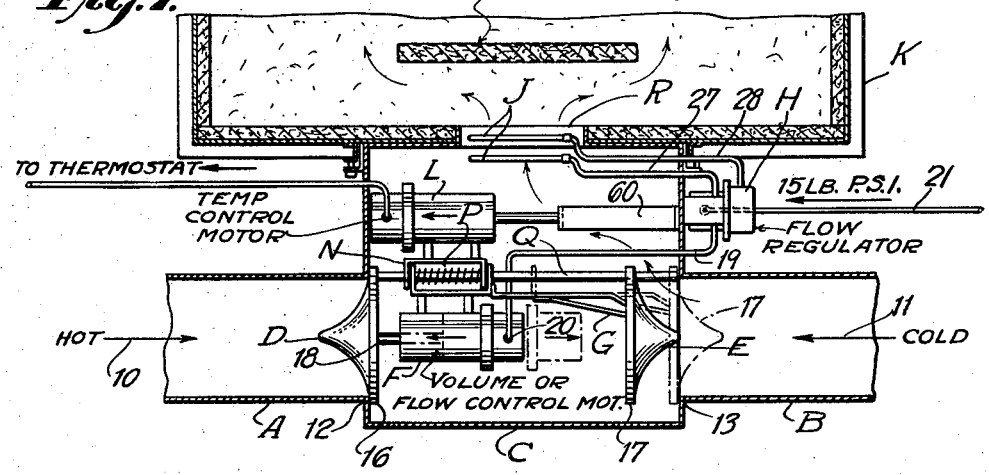
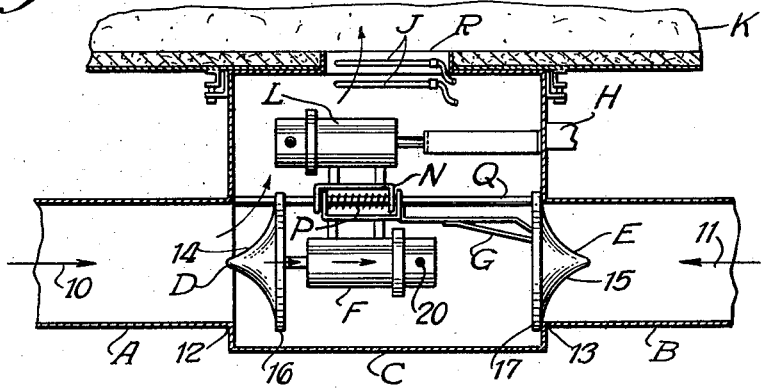
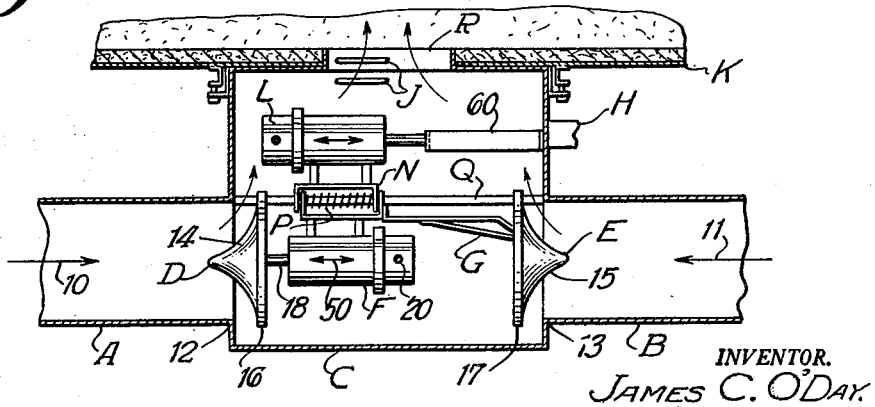

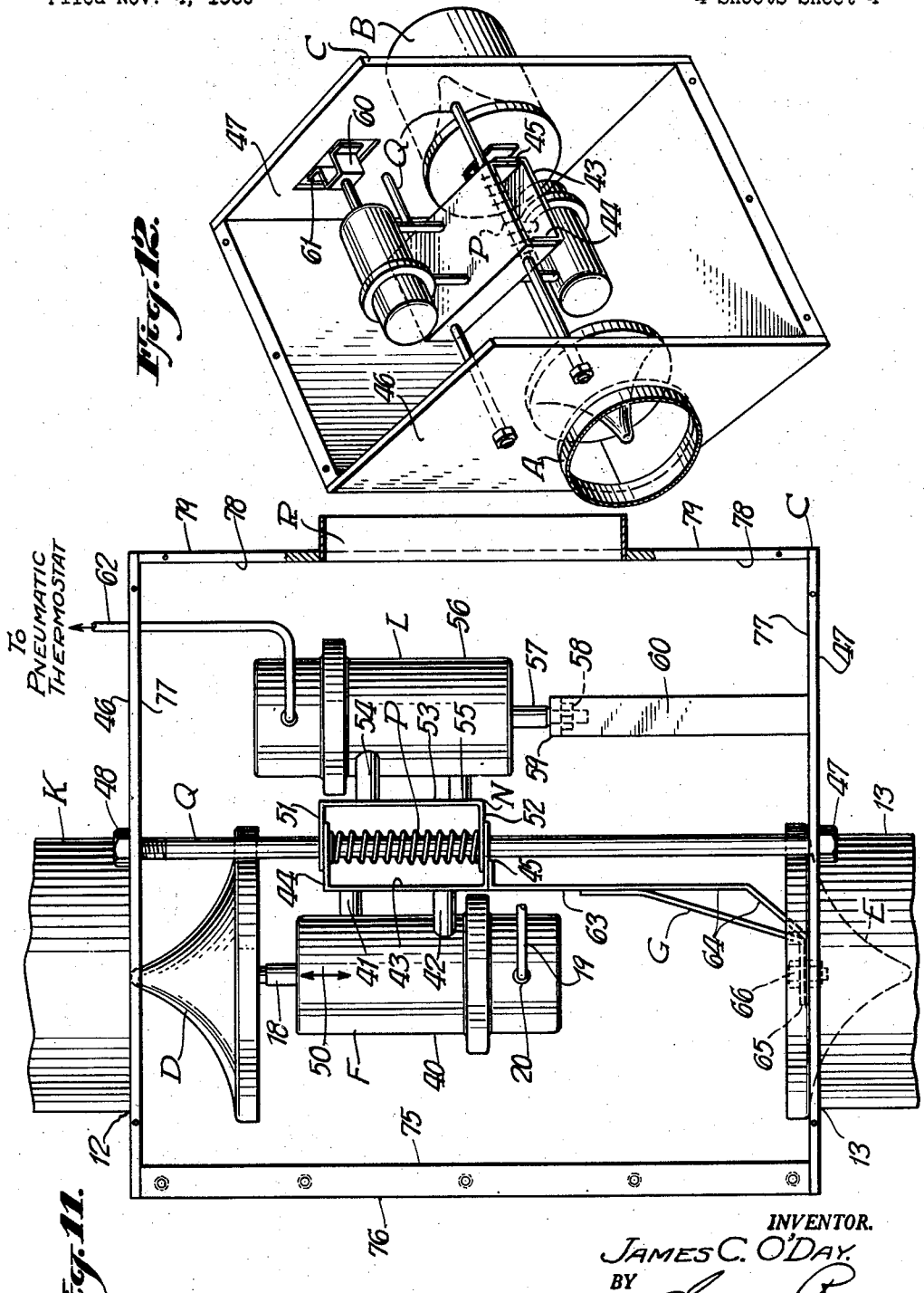

United States Patent Office 3,145,926
Patented Aug. 25, 1964

3,145,926
HIGH PRESSURE COLD AIR-HOT AIR MIXING BOX FOR A VENTILATING, HEATING AND AIR CONDITIONING SYSTEM
James C. O'Day, Port Washington, N.Y., assignor to Air Devices Inc., New York, N.Y., a corporation of New York
Filed Nov. 4, 1960, Ser. No. 67,429
8 Claims. (Cl. 236—13)

The present in invention relates to a mixing box arrangement, and it particularly relates to a mixing box in which cold air and hot air are mixed in proper proportionment and supplied to a room or other enclosure which is to be ventilated or conditioned and in which the air is to be maintained in a desired elevated or lowered temperature as compared to the outside atmosphere.

It is among the objects of the present invention to provide a reliable mixing arrangement in which hot and cold air are mixed together in desired proportions, desirably at relatively high pressures, and then are permitted to escape into the room or other enclosure after the pressure has been lowered and after suitable mixing and attenuation has taken place.

Another object is to provide a controlled mixing box arrangement in which, by means of a controlled thermostat and a flow regulator, it will be possible to quickly and accurately regulate the proportionment of hot and cold air and assure a satisfactory distribution of incoming air of desired temperature into the room without substantial noise and with constant flow of incoming air into the room or other enclosure.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most suitable to provide a mixing box with an inlet high pressure or high velocity chamber, into which there is a hot air inlet and a cold air inlet.

Desirably, the hot air inlet is normally open and the cold air inlet is normally closed, and there are provided two motors to actuate the hot inlet and cold inlet valves, one being operated by a pneumatic connection to a thermostat and the other being operated by a connection to a flow regulator.

In one preferred form of the invention, there are provided two relatively movable motor housings, which are in turn provided with flanged mountings or flange connections to guide rods, with the motors being positioned one above the other.

One of the motors, desirably associated with the flow regulator, is designed to oprate the hot inlet valve directly with another connection from the body or enclosure of the motor to a cold inlet valve.

The other motor, which is desirably associated with or operated by the pneumatic thermostat, has a suitable flanged or other mounting connection to the slide rails, and tends to close the one inlet valve while opening the other inlet valve.

The other motor, which is operated by the flow regulator, provides a distance differential between the hot and cold inlet valves and will tend to move the hot inlet and cold inlet valves together or away from each other to give such differential.

Desirably, the flange connections of these two motors to the slide or guide members permit the motors to move relatively to one another, compressing a spring which tends to expand the telescoping bases or flanges to an extended position.

In other words, during operation, with the two bases expanded with their flanges in contact by the intervening coil spring, the pneumatic thermostate wil move the hot and cold valves in unison, tending to close the cold inlet and open the hot inlet or vice versa.

On the other hand, the operation of the flow regulator will be to increase or decrease the distance between the cold and the hot inlet valves, obtaining the desired flow of air into the inlet valve chamber.

From the inlet valve chamber, the air then flows through a baffle system and a restriction arrangement to an attenuation chamber, from which it can pass into a duct or outlets at conventional pressure and velocity.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts through the several views:

FIG. 1 is a bottom isometric view of the complete arrangement of the invention, showing the valving box, together with the expansion box and the outlet ducts.

FIG. 2 is a transverse horizontal section taken upon the line 2—2 of FIG. 2, showing the valving arrangement, upon an enlarged scale as compared to FIG. 1.

FIG. 3 is a transverse sectional view upon the line 3—3 of FIG. 1, showing flow from the inlet valve chamber past the flow regulators measuring devices to the attenuation chamber, upon en enlarged scale as compared to FIG. 1.

FIG. 4 is a fragmentary transverse sectional view taken upon the line 4—4 of FIG. 3, upon an enlarged scale as compared to FIG. 3.

FIG. 5 is a diagrammatic side perspective view, showing the measuring devices as they are positioned in the box arrangement of FIGS. 3 and 4.

FIG. 6 is a transverse sectional view upon the line 6—6 of FIG. 5.

FIG. 7 is a diagrammatic side sectional view, showing the valving arrangement in the position where the hot air valve is closed and the cold air valve is open.

FIG. 8 is a transverse sectional view similar to FIG. 7, showing the arrangement in which the hot inlet valve is open and the cold inlet valve is closed.

FIG. 9 is a transverse diagrammatic sectional view, similar to FIG. 8, showing the location of the valves and the motors when both inlet and outlet valves are open.

FIG. 10 is a diagrammatic detail sectional view, showing a portion of the baffle construction.

FIG. 11 is a diagrammatic side sectional view of the inlet valve chamber, with the motors and the supporting base being shown upon an enlarged scale.

FIG. 12 is a diagrammatic side view of the inlet valve chamber, partly broken away to more clearly show the interior construction thereof.

Referring to FIGS. 7 to 9, there is shown a hot air inlet conduit A and a cold air inlet conduit B, which open into the inlet valve chamber C.

The inlet valve chamber C has a reciprocable hot inlet valve D and cold inlet valve E, with the flow regulator motor F directly actuating the hot inlet valve D and having a bracket connection at G to actuate the cold inlet valve E.

The motor F in turn is controlled from the flow regulator device H, which has the sensing connections J positioned at the exit from the inlet valve chamber C to the attenuation chamber K.

The other motor L is controlled by the thermostat M (see FIG. 1) and both motors L and F have a telescoping flanged mounting arrangement N, which will permit a distance differential between the hot and cold valves, with the intervening spring pressing the flanges of the telescoping base end together. Said base end will ride upon the guide rods Q which carry the springs P, tending to press those side flanges together.

In operation, the motor L is operated by the pneumatic thermostat M and will move the hot and cold valves backwardly and forwardly in unison.

The second motor F is operated by the flow regulator, and it provides a distance differential between the hot and cold valves.

The telescoping base arrangement N on the guide rods Q with the intervening spring P will assure constant air volume under all conditions.

Now referring specifically to FIG. 1, the hot air will flow inwardly as indicated by the arrow 10 in FIGS. 1 and 7 to 9, while the cold air will flow in through the conduit B as indicated by the arrows 11 in FIGS. 7, 8 and 9.

This air will flow through the junction point 12, which forms the seat for the hot valve D and 13 which forms the seat for the cold valve E, which valves are of conical shape, as indicated at 14 and 15, and have relatively wide flanged seating areas 16 and 17.

The valve D has a stem or axial member 18 which is connected to the interior of the motor F and which will be reciprocated by the motor F, depending upon the pneumatic control applied thereto through the tubing connection 19 to the opposite side 20 of the motor F.

This flow regulator receives air at 15 pounds per square inch, as indicated at 21, and it is responsive to the outflow of the air from the inlet valve chamber C to the outlet passage R, at which extend the two sensing devices J.

The two sensing devices J, as shown in small scale in FIGS. 3, 4 and 7 to 9 and in large scale in FIGS. 5 and 6, consist of two tubular members 22 and 23, over which the air flows, as indicated at 24, a static pressure is sensed by the openings 25 and 26 in the sides of the tubes 22 and 23 opposite the direction of flow.

This static pressure is applied through the tubular connections 27 and 28 (see FIG. 5) to the flow regulator H, which in turn controls the operation of the motor F.

The motor F will normally be fixed upon a telescoping base end, and the valve D will merely be moved backwardly and forwardly.

Unless and until the valve D is closed against the side 12 and extra pressure is applied to the motor F from the regulator H, which would then cause the cold valve E also to move away from the valve seat 12 toward the cold valve seat 13, not only is the hot air inflow cut off but also any cold air flowing out past the seat 13.

Referring to FIG. 11, the body 40 of the motor F is connected by means of the transverse extensions 41 and 42 to the bracket 43, which has the flanges 44 and 45.

These flanges 44 and 45 have openings therein, and they ride upon the guide rods Q, two of which are provided, extending between the opposite end walls 46 and 47 of the inlet valve chamber C.

These rods are held at their ends by means of the nuts 48 and 49, and they permit the flanges 44 and 45 carrying the valve body 40 to move in either direction, as indicated by the double arrow 50.

The rods Q also carry the flanges 51 and 52 extending transversely away from the plate 53, which is connected by the legs 54 and 55 to the motor body 56 of the motor L.

The motor L has a central connection rod 57, which is connected by the nuts 58 to the end 59 of the bracket 60, which is mounted by the flanges 61 on one of the end walls 47.

The movement of the motor L under the action of the connection 62 to the pneumatic thermostat M will result in a movement of the base structure 51, 52, 53 to the left. This will move the assemblage N, with the flanges 44 and 51 on one side and 45 and 52 on the other side, in contact with each other.

These flanges will be biased together by means of the coil springs P, which will press the flanges 44–51–45–52 together.

As far as the cold valve is concerned, it will be noted that it is connected by the bracket G, having the extension 63 to the plate 43 at one side and to the double support member 64 at the other side, which has flanges 65 connected by the nut and bolt 66 to the base of the cold valve E.

Therefore, in operation of the double motor system F and L of FIG. 11, the valves D and E will normally be moved back and forth, together, as the motor L is operated by the pneumatic thermostat M through the connection 62, with the motor body 56 being moved back and forth upon the connecting rod 57 upon its mounting 58 to the bracket 60.

The assemblage N will slide back and forth under these conditions on the rods Q with the flanges 44–51 and 45–52 in contact and the springs P fully extended.

When, however, the motor F is operated by the connection from the flow regulator, it will tend to separate or bring together the hot valve D and the cold valve E so as to reduce or increase the flow. This normally will not affect the assemblage N.

However, if valve D is closed against its seat 12, and the motor F continues to operate, then the flanges 44 and 51 on one side and 45 and 52 on the other side will separate, giving a lost motion and changing the distance between the valves D and E.

This, of course, will give the most effective controlling action to the valving arrangement.

Normally, the spring P will be extended, as indicated in FIG. 11, and this controlling action will not be necessary except when the distance between the valves D and E is increased, with the hot valve D against its seat 12.

As shown in FIG. 11, the box C may be lined with absorbent material 75 being used upon the outer wall 76 and sound absorbent material 77 being used upon the end walls 46 and 47. Suitable absorbent material is also used at 78 on the wall 79, which has the outlet connection R.

Referring to the attenuation chamber as best shown in FIG. 3, this attenuation chamber has the sound absorbent linings 80 adjacent the connection R and 81 along the main side walls 82 and 83 along the end walls 84.

Directly over the opening R is positioned the baffle S, which is shown in detail in FIG. 10, consisting of perforated metal 85 enclosing a fiberglass body 86. This will decrease the velocity of the flow of air indicated at 87 and also baffle any sound.

The intermediate inwardly projecting wall portions 88 in FIG. 3 also have the same effect. The air will then flow in the direction 89 (see FIG. 3) into an exhaust box 90 (see FIGS. 1 and 2), where it flows outwardly through the box 91, 92 and 93 to suitable rooms or enclosures.

By means of the arrangement shown, it is possible to achieve a quiet reduction of pressure, with suitable mixing of hot and cold air over a wide variety of conditions.

The two-motor arrangement will smoothly regulate the mixing operation and at the same time will assure proper flow as well as proper proportionment of the hot and cold air.

There will be an effective, continuous release, without undue noise or vibration, and assurance will be had that a sufficient supply of air at a proper temperature will be flowing through ducts 91, 92 and 93 at all times.

The important features of the two motor mixing box of the present invention resides in:

(a) The hot valve being normally open rather than both valves being normally open;

(b) Both valves are moved simultaneously by the thermostat control rather than moving the hot valve only;

(c) The flow regulator acts directly upon the motor F which in turn directly actuates the hot inlet valve D. This hot inlet valve can be opened and closed independent of the cold inlet valve E. This is superior to an operation in which the cold inlet valve only is operated by the flow regulator or flow control motor with the cold inlet valve upon closure serving to cause movement of the motor which in turn will operate the hot inlet valve.

(d) Only one valve is operated by a motor shaft, namely, the hot valve with the flow controller acting thereon and with the thermostat operating both valves simultaneously. This differs from a system in which two motors act directly against each valve with each valve being mounted directly on a motor shaft and with the flow controller acting on the cold valve and the thermostat acting on the hot valve.

As many changes could be made in the above two-motor mixing box, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A constant volume flow air mixing box having a thermostat control and a total flow control, opposed aligned hot air and cold air inlets, valves for said inlets, a first movable motor, actuating directly the hot inlet valve, having a cylinder and a piston, a connection from the piston to the hot inlet valve, a bracket supporting said cylinder, a connection from said bracket to said cold inlet valve, guide members carrying said bracket permitting movement of the cylinder, a second movable motor having a second cylinder and a second piston, a second bracket carrying said second cylinder, said second bracket being mounted on said guide members, spring means to press said brackets together, a fluid pressure connection from said thermostat control to said second movable motor, a fluid pressure connection from said total flow control to said first movable motor, said second motor serving to move said brackets as pressed together and thereby move said first motor and said connections and said valves and said spring means being compressed by action of said first motor to permit separating movement between said brackets when the said hot valve is moved against its inlet and is stopped against further movement whereby the other valve may be moved toward its seat.

2. The box of claim 1, said brackets including mounting plates and edge flanges and said edge flanges of said plates being in contact and said spring means serving to bias said flanges into contact with each other.

3. The box of claim 1, said guide members consisting of guide rods positioned between and parallel to the motors and said brackets having mounting plates on opposite sides of said guide rods and said mounting plates having oppositely directed flanges extending toward and engaging said guide rods and in contact with one another and said spring means including coil springs encircling said guide rods and pressing said flanges together.

4. The box of claim 1, said motors being superimposed and having parallel axes and the connection from the flow control leading to the first motor and the thermostat connection from the thermostat control leading to the second motor.

5. In a constant volume flow air mixing box of the type having opposed aligned cold air and warm air inlets and an outlet for the air mixture produced in the mixing box, a conical valve controlling each of said inlets, first and second parallel axis motors each having a reciprocable piston element and a cylindrical body member, a total flow controller connected to the first motor to move the valves apart and together, a thermostat connected to the second motor to actuate said second motor, two horizontal parallel sliding platforms, said body members being respectively mounted on said platforms at the central portions thereof, said platforms at the ends thereof having flanges turned toward each other and overlapping, a pair of guide rods extending between the motors and parallel to the axes of the motors and aligned air inlets and extending through said flanges, and coil spring means encircling said guide rods between said flanges biasing said platforms together, said hot valve being normally open, a direct operating connection from the first motor to the warm air valve, a mechanical operating connection from the platform supporting the first motor to the cold air valve, said second motor moving said platforms and said motors all toegther and said first motor compressing said spring means and permitting separation between said platforms when the warm air valve is stopped against its seat.

6. In a constant volume flow air mixing box of the type generating a flow of air of proper temperature, a flow controller actuated by said flow of air, said box having opposed aligned cold air and warm air inlets and an outlet for the air mixture produced in the mixing box, a conical valve controlling each of said inlets, a first motor having a reciprocable piston to move one conical valve, a piston connection from said motor to said one valve and a cylindrical body member, a bracket supporting said cylindrical body member, a mechanical connection from said movable bracket to move the other valve, a flow controller connected to the first motor, a second motor also having a piston and body member, a movable bracket to support said second motor, said bracket contacting said first mentioned bracket to move the first motor, a thermostat connected to the second motor, said brackets including two parallel sliding platforms, said body members being respectively mounted on opposite sides of said platforms, said platforms at the ends thereof having flanges turned toward each other, a pair of guide rods extending between the motors and parallel to the axes of the motors and the aligned air inlets and extending through said flanges, and coil spring means encircling said guide rods biasing said flanges together, so that said valves will move together under action of the thermostat until one valve is closed and then apart when said springs are compressed upon further action of the first motor under action of the flow controller.

7. A hot and cold air mixing unit for delivering a flow of air, comprising an air mixing box provided with cold air and warm air inlets and an air outlet for delivering air, a valve member in the box for controlling each of said air inlets, a first movable carrier mounted in the box, an actuator for one of said valve members mounted on said carrier, said actuator having means for independently moving said one valve member toward and away from the respective air inlet, a second actuator for moving the first actuator, a thermostat connected only with the second actuator, a second carrier for said second actuator, a flow control measuring said flow of air, an actuating connection from said flow control to the first actuator connected only with the first actuator, springs for holding said movable carriers together and said first actuator compressing said springs and separating the carriers when one of said valves is closed to move the other valve to closure position.

8. A hot and cold air mixing unit for delivering a flow of air, comprising an air mixing box including a high pressure chamber and a low pressure chamber connected by an orifice for the flow of air from the high pressure chamber to the low pressure chamber, the low pressure chamber having an air outlet for delivering air, said high pressure chamber being provided with cold air and warm air inlets, valve members in the high pressure chamber for controlling each of said air inlets, movable first and second carriers mounted in the high pressure chamber, a first actuator for one of said valve members mounted on said first carrier a second actuator mounted on the second carrier, a thermostat control connected with and controlling the second actuator adapted to operate in response to changes in the temperature of the air in an enclosure, a total flow control to measure said flow of air located in the low pressure chamber and a connection from said flow control to and operating said first actuator, spring means to hold said carriers together, said second actuator moving said carriers together and said first actuator compressing said spring means and moving said carriers apart when one of said valve members has been seated against its respective inlet to cause the other valve member to move toward its respective inlet.

References Cited in the file of this patent
UNITED STATES PATENTS

| | | |
|---|---|---|
| 1,347,689 | Fitts | July 27, 1920 |
| 2,821,343 | Payne | Jan. 28, 1958 |
| 2,880,743 | Kreuttner | Apr. 7, 1959 |
| 2,896,849 | Argentieri | July 28, 1959 |
| 2,981,474 | Drummond et al. | Apr. 25, 1961 |

OTHER REFERENCES

Air Conditioning Heating and Ventilating, for February 1960, pages 70–73.